United States Patent
Gillis et al.

(10) Patent No.: US 8,266,779 B2
(45) Date of Patent: Sep. 18, 2012

(54) METHOD OF ATTACHING SETTING AND USING A SELF-DRILLING ANCHOR SCREW WITH ONE TOOL

(75) Inventors: Robert Andrew Gillis, Apopka, FL (US); Dallas A. Powell, Winter Garden, FL (US)

(73) Assignee: Rhino Self-Drilling Anchor GP, Coppell, TX (US)

( * ) Notice: Subject to any disclaimer, the term of this patent is extended or adjusted under 35 U.S.C. 154(b) by 248 days.

(21) Appl. No.: 12/860,925

(22) Filed: Aug. 22, 2010

(65) Prior Publication Data

US 2010/0316465 A1    Dec. 16, 2010

Related U.S. Application Data

(62) Division of application No. 11/483,937, filed on Jul. 10, 2006, now abandoned.

(51) Int. Cl.
*B21D 39/00* (2006.01)
*F16B 13/04* (2006.01)

(52) U.S. Cl. ... 29/432; 29/432.1; 29/525.01; 29/525.02; 29/525.11; 29/798; 411/29; 411/60.1; 411/387.1; 411/387.6

(58) Field of Classification Search .......... 29/432, 29/432.1, 525.01, 525.02, 525.03, 525.11, 29/798; 411/29, 60.1, 60.2, 57.1, 387.1, 411/387.3–387.8

See application file for complete search history.

(56) References Cited

U.S. PATENT DOCUMENTS

| | | | | |
|---|---|---|---|---|
| 4,904,134 A | * | 2/1990 | Fischer | 411/54 |
| 5,213,459 A | * | 5/1993 | Palm | 411/29 |
| 5,297,909 A | * | 3/1994 | Tsay et al. | 411/29 |
| 5,439,338 A | * | 8/1995 | Rosenberg | 411/400 |
| 5,687,801 A | * | 11/1997 | Paterson et al. | 173/1 |
| 5,816,760 A | * | 10/1998 | Mattner et al. | 411/30 |

FOREIGN PATENT DOCUMENTS

GB    2254392 A   * 10/1992

* cited by examiner

*Primary Examiner* — Jermie Cozart
(74) *Attorney, Agent, or Firm* — Barry Dove Patent Services, Inc.

(57) ABSTRACT

A unique self-drilling anchor screw is configured so that it can be set and used to secure a first object to a second object using only one tool to save time and effort. A nut of the screw engages a nut stop when turning in reverse, thereby driving rotation of the screw in reverse. The screw has a drill bit tip adapted for drilling a hole while turning in reverse. A hole is drilled using the drill bit tip while turning the nut in reverse with a socket wrench of the one tool. After drilling the hole, the nut is turned in the forward direction with the socket wrench to engage a sleeve member of the screw, which sets the screw in the second object. Then, the nut is further turned forward using the socket wrench to tighten the nut against the first object located between the nut and the second object.

20 Claims, 7 Drawing Sheets

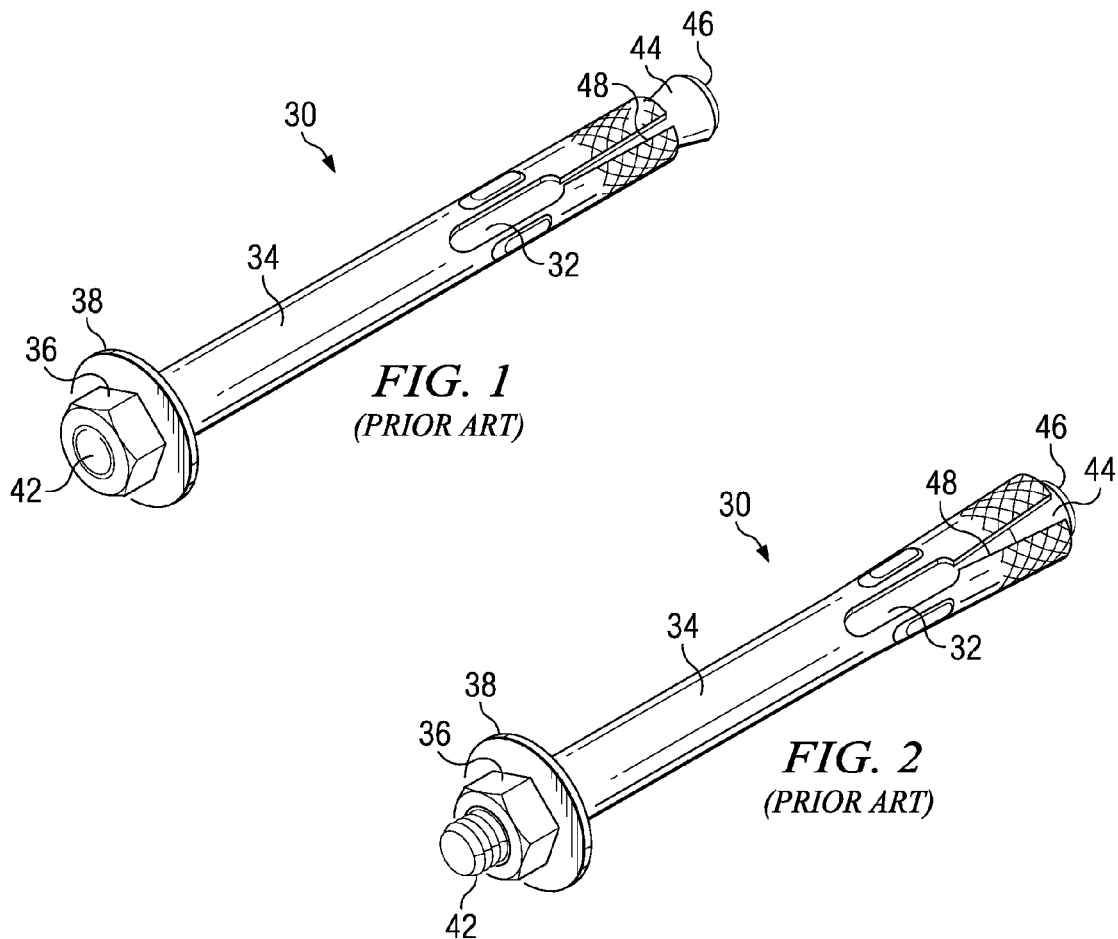
FIG. 1 (PRIOR ART)
FIG. 2 (PRIOR ART)
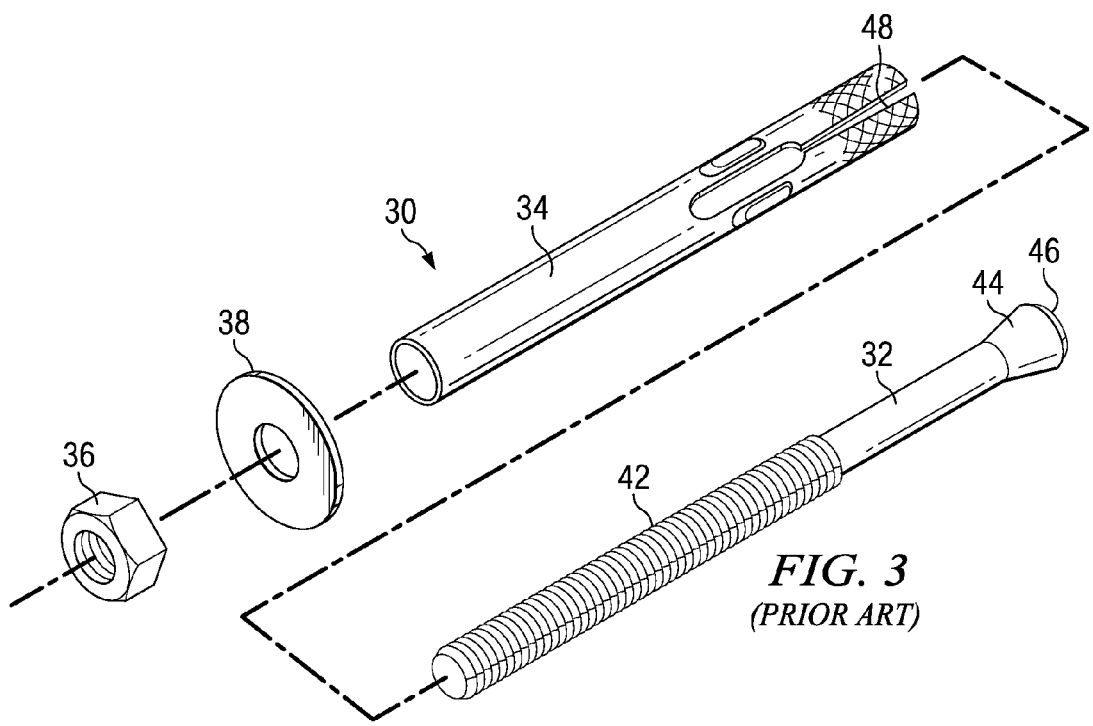
FIG. 3 (PRIOR ART)

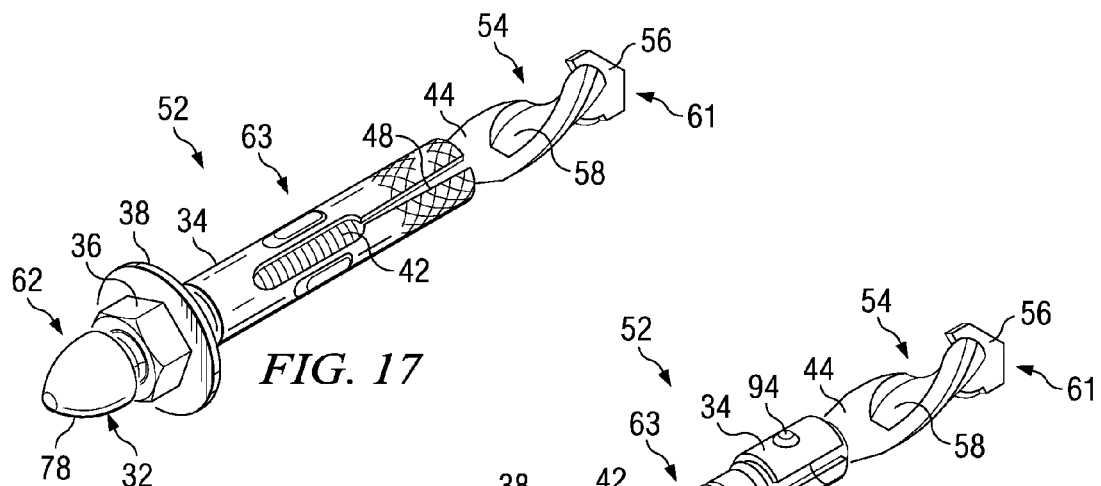
FIG. 17
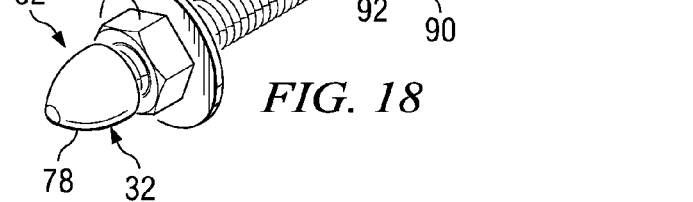
FIG. 18
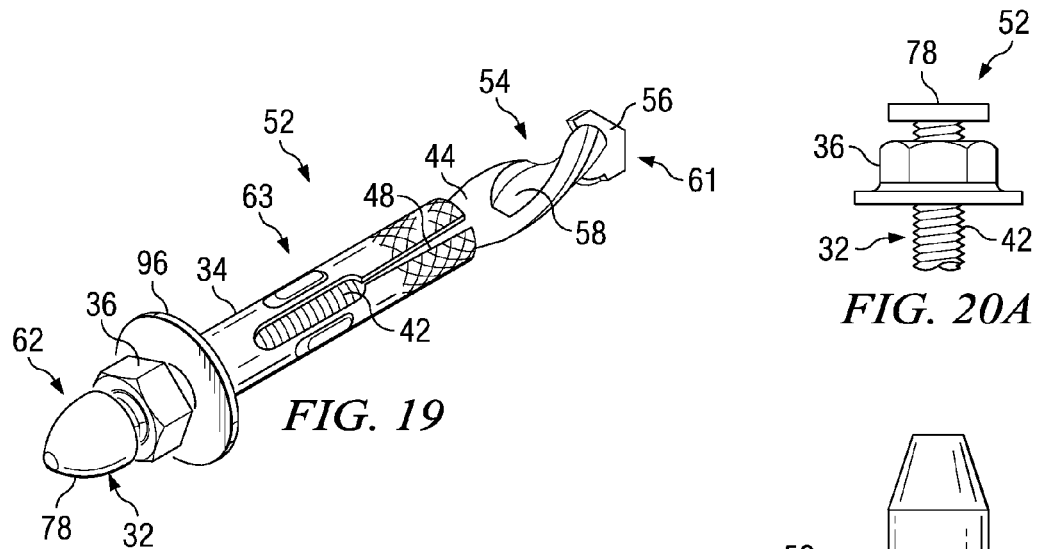
FIG. 19
FIG. 20A
FIG. 20B
FIG. 20C

METHOD OF ATTACHING SETTING AND USING A SELF-DRILLING ANCHOR SCREW WITH ONE TOOL

PRIORITY CLAIM

The present application is a divisional application of U.S. patent application Ser. No. 11/483,937 filed on Jul. 10, 2006, now abandoned and which is incorporated herein by reference.

TECHNICAL FIELD

The present invention generally relates to anchor screws. In one aspect it relates more particularly to a self-drilling anchor screw for placement in concrete, stone, or other masonry materials.

BACKGROUND

FIGS. 1-3 show a conventional sleeve-type anchor screw 30, and FIG. 4 shows a conventional wedge-type anchor screw 50. These conventional screws 30, 50 may be found in most hardware stores and are widely used. Turning first to the sleeve-type anchor screw 30 shown in FIGS. 1-3, the sleeve-type anchor screw 30 is made of four separate pieces (see FIG. 3) that work together to provide the function of anchoring the screw 30 into a material (e.g., masonry wall, concrete floor, cinder block, mortar). The sleeve-type anchor screw 30 has a shaft member 32, a sleeve member 34, a nut 36, and a washer 38. FIG. 3 shows the pieces separated and FIGS. 1 and 2 show the pieces operably assembles to form the sleeve-type anchor screw 30. The shaft member 32 has a threaded shaft portion 42 adapted to accept the nut 36. The sleeve 34 and the washer 38 are adapted to fit over the shaft member 32. The shaft member 32 has a transition portion 44 and a flat, blunt end 46.

Next, the typical method of installing and using the sleeve-type anchor screw 30 of FIGS. 1-3 will be described. The installation and use requires a minimum of three steps using three different tools and two devices (a drill bit and the anchor screw 30). First, a hole is drilled using a conventional masonry drill bit (not shown). The hole needs to be the correct diameter corresponding to the sleeve-type anchor screw 30 to be used. Otherwise, the sleeve-type anchor screw 30 will not work properly (i.e., not supporting the specified amount of force) or may not work at all. The masonry drill bit is usually driven with a hammer drill (not shown), but may be driven by a regular drill as well. In such case, the masonry drill bit is held by the drill chuck. Usually a conventional masonry drill is designed for many uses (to drill many holes). A typical masonry bit has a spade-shaped tungsten carbide tip mounted on the tip of a fluted shaft. The flutes help remove the debris (dust) from the hole during drilling. The shaft of the masonry drill bit is usually made from a relatively soft and flexible steel that differs from the hard, more-brittle cutting tip.

Once the hole is drilled, the second step is to insert the sleeve-type anchor screw 30 into the pre-drilled hole. Usually, the sleeve-type anchor screw will need to be driven into the hole (e.g., hammered) due to a desired snug fit. This step typically requires the use of a hammer to slide the sleeve-type anchor screw 30 into the hole. The object that is being fastened to the material (that the hole was drilled into) is usually held in place while the sleeve-type anchor screw 30 is inserted into the hole. If the object is large and/or heavy, this may require a second person to hold the object in place because the first person inserting the sleeve-type anchor screw may need two hands to insert the sleeve-type anchor screw (e.g., one hand to hold the sleeve-type anchor screw 30 and the other hand to swing the hammer).

After the sleeve-type anchor screw 30 is driven into the hole to a desired depth, the third step is to tighten the nut 36 and expand the sleeve 34 within the hole. During this step, the object will still need to be held by the first person and/or the second person. Typically, the first person must set down the hammer and pick up a different tool for tightening the nut. The nut may be tightened with any wrench, but is more preferably tightened with a power tool for speed and less effort, such as an impact gun and socket. As the nut 36 is tightened, the transition portion 44 of the shaft member 32 is drawn toward the sleeve 34 and engages the sleeve 34. The sleeve 34 of the sleeve-type anchor screw 30 shown in FIGS. 1-3, has longitudinal slots 48 formed therein. As the sleeve 34 engages the transition portion 44, the sleeve 34 is flared open at the slots 48. This is shown in FIG. 2. The more the nut 36 is tightened, the more the sleeve 34 is forced over the transition portion 44 of the shaft member 32. This causes the sleeve-type anchor screw 30 to be wedged into the hole very tightly. This wedging configuration within the material (within the hole) provides a very strong and secure anchoring of the sleeve-type anchor screw 30. For example, a typical ⅜ inch diameter sleeve-type anchor screw may be capable of holding up to 2000 pounds of pulling force on it when it is set in the material properly.

The conventional wedge-type anchor screw 50 of FIG. 4 has a sleeve 34 also, but the sleeve 34 in FIG. 4 is smaller than the sleeve 34 of the conventional sleeve-type anchor screw 30 of FIGS. 1-3. The conventional wedge-type anchor screw 50 shown in FIG. 4 is set and used with the same three-tool three-step process described above for the conventional sleeve-type anchor screw 30. Conventional wedge-type anchor screws 50 are preferred by some users, and may have a greater holding strength than a same-diameter sleeve-type anchor screw 30. However, many users find that the sleeve-type anchor screws 30 are easier to install with fewer jams while hammering the anchor screw into the pre-drilled hole.

This three-tool three-step process of setting conventional sleeve-type anchor screws 30 and conventional wedge-type anchor screws 50 is quite time consuming and requires a lot of man hours. Hence, there is a need for an easier way to set and use a sleeve-type anchor screw, while still providing the strength of the conventional sleeve-type anchor screw. It would be highly desirable to eliminate one or more of the tools needed to reduce the cumbersome process of switching tools at every step. Man hours or labor costs tend to be much more expensive than the cost of screws. Thus it also would be highly desirable to provide an anchor screw that can be set and used much faster, requiring fewer man hours, even if the screws cost slightly more than conventional anchor screws.

SUMMARY OF THE INVENTION

The problems and needs outlined above may be addressed by embodiments of the present invention. In accordance with one aspect of the present invention, a self-drilling anchor screw is provided, which includes a shaft member, a drill bit portion, a threaded shaft portion, a transition portion, a nut, a sleeve, and a nut stop portion. The shaft member includes a first end, second end, and a central portion extending between the first and second ends. The drill bit portion is located at the first end of the shaft member. The threaded shaft portion is located along at least part of the central portion of the shaft member. The transition portion of the shaft member is located between the threaded shaft portion and the drill bit portion. At least part of the transition portion has a larger cross-section area than that of the threaded shaft portion. The nut has nut threads adapted to thread onto the threaded shaft portion of the shaft member. The nut is located on the threaded shaft portion. The sleeve is located about the shaft member. At least part of the sleeve is located adjacent to the transition portion. The sleeve is capable of sliding along the shaft member for engaging the transition portion. The nut stop portion is located at the second end of the shaft member. The nut stop portion is adapted to prevent the nut from being unscrewed from the threaded shaft portion at the second end of the shaft member.

This paragraph describes some embodiments of the aspect of the present invention described in the immediately preceding paragraph. The drill bit portion preferably includes a masonry bit. The drill bit portion preferably includes a tungsten carbide tip. The sleeve may extend over and be adapted to slide over at least part of the threaded shaft portion. The shaft member may include a sleeve-retention portion located adjacent to the transition portion and located between the transition portion and the threaded portion, such that the sleeve is located about the shaft member at the sleeve-retention portion, and such that the sleeve-retention portion includes a sleeve-stop portion adapted to hinder the sleeve from moving past the sleeve-stop portion toward the threaded portion. The sleeve may include a bump portion extending from an outside surface of the sleeve. The nut preferably includes a hexagonal portion and a flared portion, such that the flare portion having a larger diameter than a hexagonal portion. The drill bit portion preferably includes threaded flutes. In such case, the threaded flutes preferably spiral in a first spiral direction, with the threaded portion of the shaft member spiraling in a second spiral direction, and the first spiral direction is opposite the second spiral direction. The drill bit portion may be adapted to cut when rotating in a counter-clockwise direction, and the first spiral direction may be a reverse thread direction. The threaded flutes may spiral in a first spiral direction, and the threaded portion of the shaft member also spiral in the first spiral direction. The screw may further include a washer located about the central portion of the shaft member, such that the washer is located between the nut and the sleeve. The nut stop portion may have an elongated shape extending from the second end of the shaft member. Alternatively, the nut stop portion may have a generally flattened shape. The sleeve preferably includes a longitudinal slit for allowing the sleeve to expand as it is pushed against the transition portion of the shaft member.

In accordance with another aspect of the present invention, a self-drilling anchor screw is provided, which includes a shaft member, a masonry drill bit, a threaded shaft portion, a transition portion, a nut, a sleeve, and a nut stop portion. The shaft member includes a first end, second end, and a central portion extending between the first and second ends. The masonry drill bit is located at the first end of the shaft member. The threaded shaft portion is located along at least part of the central portion of the shaft member. The transition portion of the shaft member is located between the threaded shaft portion and the masonry drill bit. At least part of the transition portion has a larger cross-section area than that of the threaded shaft portion. The nut has nut threads adapted to thread onto the threaded shaft portion of the shaft member. The nut is located on the threaded shaft portion. The nut includes a hexagonal portion and a flared portion. The flare portion has a larger diameter than a hexagonal portion. The sleeve is located about the shaft member and located along part of the central portion between the nut and the transition portion. The sleeve is capable of sliding along the shaft member for engaging the transition portion. The sleeve includes a longitudinal slit for allowing the sleeve to expand as it is pushed against the transition portion of the shaft member. The nut stop portion is located at the second end of the shaft member. The nut stop portion is adapted to prevent the nut from being unscrewed from the threaded shaft portion at the second end of the shaft member. The self-drilling anchor screw may be used in attaching a first object to a second object in a method including the steps of: (i) engaging the nut with a socket wrench; (ii) turning the socket wrench in a reverse or counter-clockwise direction while pressing the socket wrench against the nut toward a surface of a second object into which the self-drilling anchor screw will be installed so that the masonry bit is engaging the surface, wherein the nut engages the nut stop portion so that the nut drives the rotation of the shaft member; (iii) drilling a hole into the second object using the masonry bit during the turning in the counter-clockwise direction, wherein part of the self-drilling anchor screw enters into the hole and into the second object during the drilling; (iv) after the self-drilling anchor screw is drilled into the second object to a desired depth, turning the nut with the socket wrench in a forward or clockwise direction so that the nut presses the sleeve toward the transition portion of the shaft member, thereby expanding the sleeve at the transition portion of the shaft member as the longitudinal slit engages the transition portion and thereby anchoring the self-drilling anchor screw in the second object; and (v) tightening the nut further to attach the first object to the second object using the anchored self-drilling anchor screw.

In accordance with yet another aspect of the present invention, a method of attaching a first object to a second object using a self-drilling anchor screw is provided. This method includes the use of a self-drilling anchor screw including: (i) a shaft member comprising a first end, second end, and a central portion extending between the first and second ends; (ii) a drill bit portion at the first end of the shaft member; (iii) a threaded shaft portion located along at least part of the central portion of the shaft member; (iv) a transition portion of the shaft member located between the threaded shaft portion and the drill bit portion, wherein at least part of the transition portion has a larger cross-section area than that of the threaded shaft portion; (v) the nut having nut threads adapted to thread onto the threaded shaft portion of the shaft member, and the nut being located on the threaded shaft portion; (vi) a sleeve located about the shaft member and at least part of the sleeve being located adjacent to the transition portion, the sleeve being capable of sliding along the shaft member for engaging the transition portion; and (vii) a nut stop portion at the second end of the shaft member, the nut stop portion being adapted to prevent the nut from being unscrewed from the threaded shaft portion at the second end of the shaft member. The method includes the steps of: (i) engaging a nut of the self-drilling anchor screw with a socket wrench; (ii) turning the socket wrench in a first direction while pressing the socket wrench against the self-drilling anchor screw toward a surface of a second object into which the self-drilling anchor screw will be installed so that the masonry bit is engaging the surface, wherein the nut engages the nut stop portion so that the nut drives the rotation of the shaft member; (iii) drilling a hole into the second object using the masonry bit during the turning in the first direction, wherein part of the self-drilling anchor screw enters into the hole and into the second object during the drilling; (iv) after the self-drilling anchor screw is drilled into the second object to a desired depth, turning the nut with the socket wrench in a second direction so that the nut presses the sleeve toward the transition portion of the shaft member, thereby expanding the sleeve at the transition portion of the shaft member as the sleeve engages the transition portion and thereby anchoring the self-drilling anchor screw in the second object, wherein the second direction is opposite the first direction; and (v) tightening the nut further to attach the first object to the second object using the anchored self-drilling anchor screw. The first direction is preferably a counter-clockwise direction and the second direction is preferably a clockwise direction. Alternatively, the first direction may be a clockwise direction and the second direction may be a counter-clockwise direction.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which:

FIGS. 1-3 show a conventional sleeve-type anchor screw of the prior art;

FIG. 17 shows a self-drilling anchor screw in accordance with a fourth illustrative embodiment of the present invention;

FIG. 18 shows a self-drilling anchor screw in accordance with a fifth illustrative embodiment of the present invention;

FIG. 19 shows a self-drilling anchor screw in accordance with a sixth illustrative embodiment of the present invention;

FIGS. 20A-20F show variations of nut stop portions that may be incorporated into an embodiment of the present invention.

DETAILED DESCRIPTION OF ILLUSTRATIVE EMBODIMENTS

Figure 4:
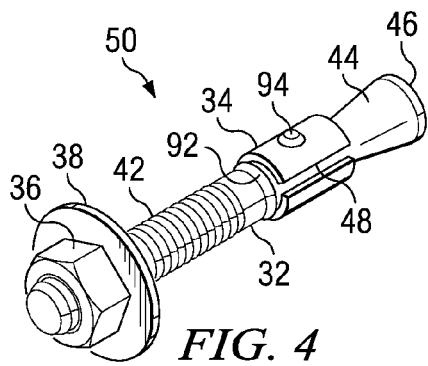
FIG. 4 shows a conventional wedge-type anchor screw of the prior art.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Generally, an embodiment of the present invention provides a self-drilling anchor screw and a method of using the same. As described above in the Background section, FIGS. 1-4 illustrate a conventional sleeve-type anchor screw 30 and a conventional wedge-type anchor screw 50. These conventional anchor screws of FIGS. 1-4 require pre-drilled holes and typically require a three-tool three-step process (see description above in Background section) to set and use them. An embodiment of the present invention provides an improved anchor screw that is self-drilling, and thus should not require a pre-drilled hole during typical usage. Also, an embodiment of the present invention may reduce the three-tool three-step process to a one-tool two-step process. The following description and associated figures of a few illustrative embodiments of the present invention will describe and illustrate how an embodiment of the present invention may accomplish these functions.

FIGS. 5-8 illustrate a self-drilling anchor screw 52 in accordance with a first illustrative embodiment of the present invention. FIGS. 9-13 show an illustrative method for using the self-drilling anchor screw 52 of the first embodiment.

Figure 5:
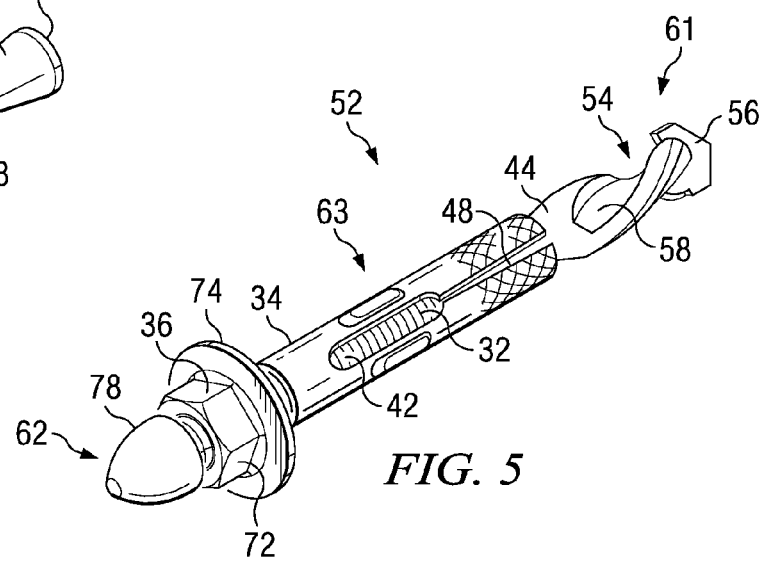
FIG. 5 shows a self-drilling anchor screw in accordance with a first illustrative embodiment of the present invention.
Figure 6:
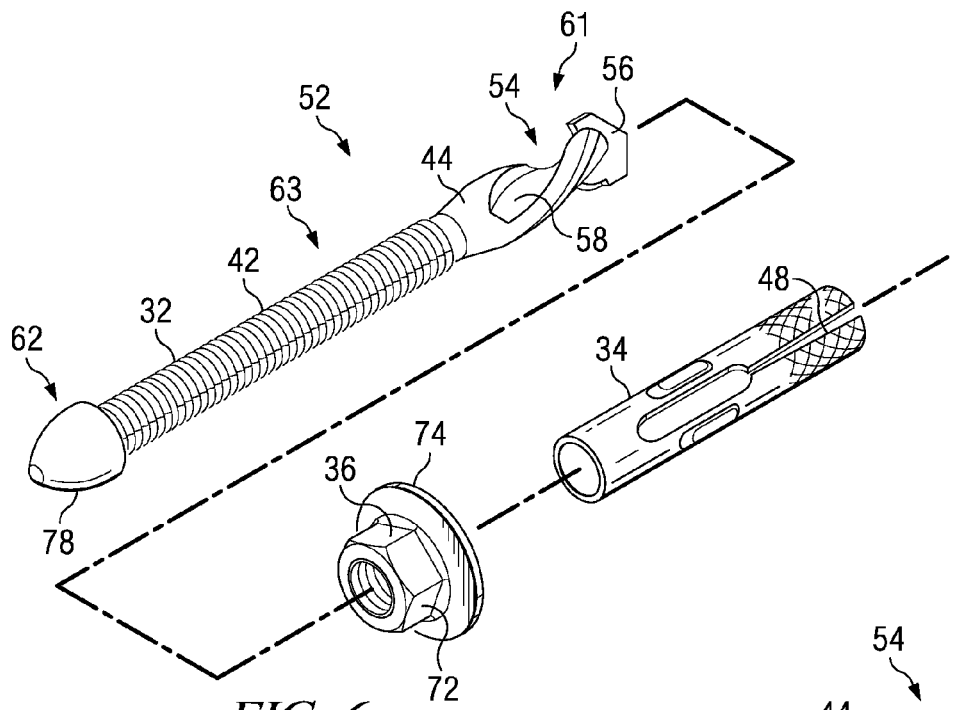
FIG. 6 is an exploded view of the self-drilling anchor screw shown in FIG. 5.
Figure 7:
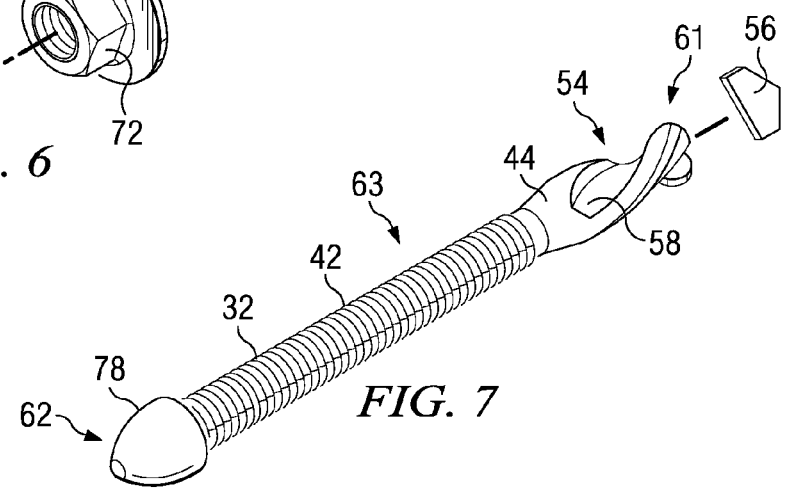
FIG. 7 is an exploded view of the shaft member of the self-drilling anchor screw of FIG. 5.

First, the self-drilling anchor screw 52 will be described with reference to FIGS. 5-8. FIG. 5 shows the operably assembled self-drilling anchor screw 52 of the first embodiment in the way it would normally be sold and ready for usage. FIG. 6 is an exploded view of the self-drilling anchor screw 52 shown in FIG. 5 to better illustrate some of its components. The self-drilling anchor screw 52 has a shaft member 32. The shaft member 32 has a first end 61, a second end 62, and a central portion 63. FIG. 7 is an exploded view of the shaft member 32 for the self-drilling anchor screw 52 of FIG. 5.

A drill bit portion 54 is at the first end 61 of the shaft member 32. As will be described more below, the drill bit portion 54 is used to drill a hole into an object (e.g., wall, floor, ceiling, column, pillar, support beam, foundation, etc.) for insertion of the anchor screw 52. In a preferred embodiment, the drill bit portion 54 is an integral part of the shaft member 32 formed of the same material, but with a harder tip 56 inserted therein (see FIG. 7). In a preferred embodiment, the drill bit portion's tip 56 is made from tungsten carbide, or some alloy thereof, for example. The anchor screw 52 of the first embodiment has a masonry drill bit for the drill bit portion 54, which is adapted to drill a hole into concrete, stone, brick, cinder block, mortar, and other masonry objects. The drill bit portion 54 of the first embodiment is designed to drill a hole best while rotating in a reverse or counter-clockwise rotation direction. As is also preferred, the drill bit portion 54 of the first embodiment has reverse-threaded flutes 58, which help in removing cut debris (dust) from the hole during drilling in a reverse direction.

The shaft member 32 has a threaded shaft portion 42 located along at least part of the central portion 63 of the shaft member 32. In the first embodiment, and as is preferred, the threaded shaft portion 42 has threads that spiral in a forward or clockwise direction, which is opposite the direction of the reverse-threaded flutes 58 of the drill bit portion 54. A transition portion 44 of the shaft member 32 is located between the threaded shaft portion 42 and the drill bit portion 54. At least part of the transition portion 44 (toward the first end 61) has a larger cross-section area than that of the threaded shaft portion 42. A nut 36 is located about the shaft member 32 at the threaded shaft portion 42. The nut 36 has nut threads adapted to be threaded onto the threaded shaft portion 42, as shown in FIG. 5. As is preferred, the nut 36 of the first embodiment is a flared nut, having a hexagonal portion 72 and a flared portion 74. The flared portion 74 has a larger diameter than the hexagonal portion 72.

Figure 8:
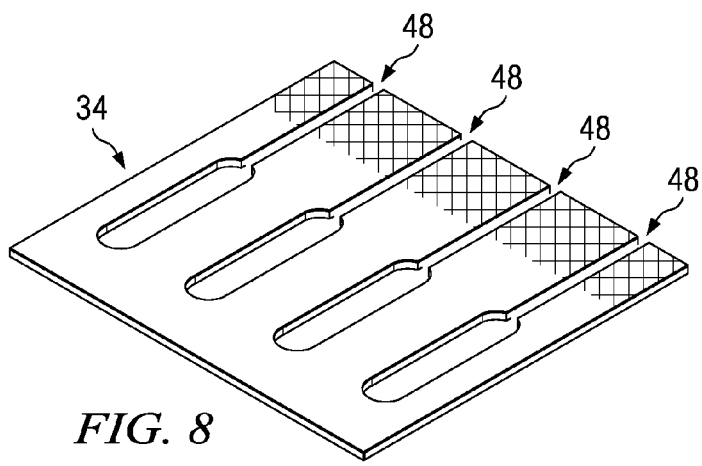
FIG. 8 is an unrolled view of the sleeve of the self-drilling anchor screw of FIG. 5.

A sleeve 34 is located about the shaft member 32 and located along part of the central portion 63 of the shaft member 32. As shown in FIG. 5, the sleeve 34 is located between the nut 36 and the transition portion 44. The sleeve 34 is capable of sliding along the shaft member 32 for engaging the transition portion 44. The sleeve 34 includes longitudinal slits 48 for allowing the sleeve 34 to expand as it is pushed against the transition portion 44 of the shaft member 32. To provide such expansion, the transition portion 44 has a larger diameter toward the first end 61, which is larger than the inner diameter of the sleeve 34 (before it is expanded). FIG. 8 shows the illustrative sleeve 34 of the first embodiment in an unrolled configuration. During manufacturing of the anchor screw 52, the sleeve 34 may be stamped out of sheet metal to form the structure shown in FIG. 8, for example. Then, the sleeve 34 may be formed into a cylinder shape so that it can be located about the shaft member 32. The sleeve 34 of the first embodiment functions much like the sleeve 34 shown in the conventional sleeve-type anchor screw 30 of FIGS. 1-3.

The shaft member 32 also has a nut stop portion 78 at the second end 62 of the shaft member 32. The nut stop portion 78 is adapted to prevent the nut 36 from being unscrewed from the threaded shaft portion 42 at the second end 62 of the shaft member 32. In the first embodiment, the nut stop portion 78 is generally bullet shaped with a largest diameter greater than the diameter of the threaded shaft portion 42.

Some other illustrative embodiments of the present invention, and some illustrative variations on the components of a self-drill anchor screw of an embodiment of the present invention, will be described below. But first, an illustrative method for using the self-drilling anchor screw 52 of the first embodiment will be described with reference to FIGS. 9-13. FIGS. 9-13 illustrate a self-drilling anchor screw 52 of the first embodiment being used to attach a first object 81 to a second object 82.

Figure 9:
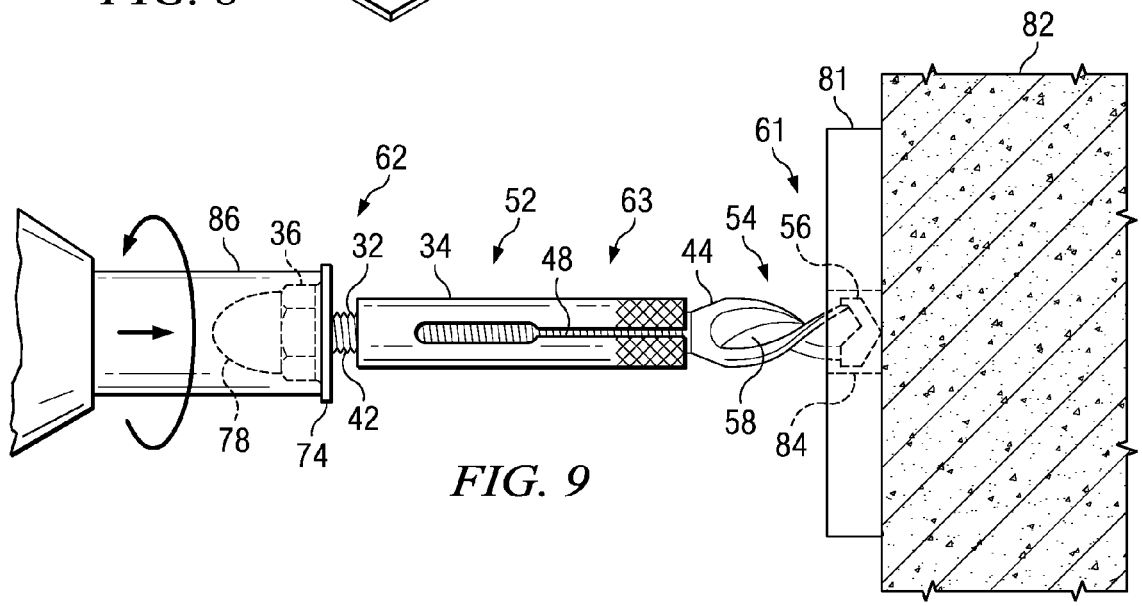
FIGS. 9-13 show an illustrative method for using the self-drilling anchor screw of the first embodiment.
Figure 10:
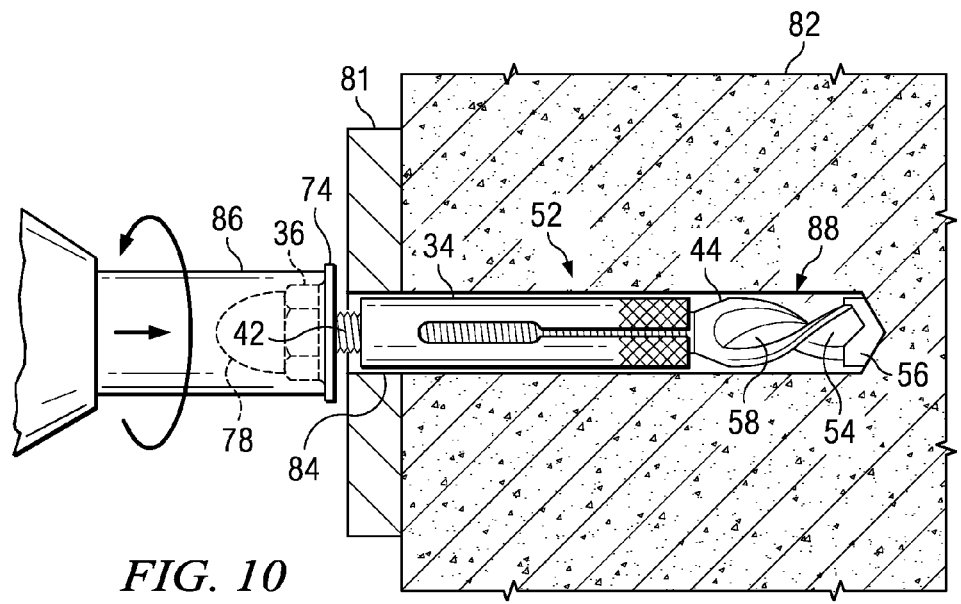

As shown in FIG. 9, the self-drilling anchor screw 52 is inserted into a hole 84 (or it could be a slot alternatively) formed in the first object 81 (e.g., a mounting hole in a bracket). The nut 36 of the self-drilling anchor screw 52 of the first embodiment is engaged with a socket wrench 86. The socket wrench 86 may be turned using any tool. But in most of the practical applications, a power tool (e.g., hand-held electric drill, cordless drill, hammer drill, impact wrench, pneumatic-driven drill) will be used to drive the rotation of the socket wrench 86. The socket wrench 86 is driven in a reverse or counter-clockwise direction while pressing on the nut 36. Because a flared nut 36 is used in the first embodiment, the socket wrench 86 can press against the flared portion 74 of the nut 36 to allow a pushing of the self-drilling anchor screw 52 toward the second object 82 (e.g., wall). As the socket wrench 86 is driven in the reverse direction, the nut 36 threads along the threaded shaft portion 42 until it engages the nut stop portion 78 (if it is not already engaging the nut stop portion 78). The nut stop portion 78 prevents the nut 36 from unscrewing from the threaded shaft portion 43 (prevents it from being removed from the shaft member 32 at the second end 62). The engagement of the nut 36 against the nut stop portion 78 and the threads on the threaded shaft portion 42 allow the nut 36 to drive the rotation of the entire anchor screw 52. The masonry tip 56 of the drill bit portion 54 engages the surface of the second object 82. As the self-drilling anchor screw 52 is turned and pushed against the surface of the second object 82, the drill bit portion 54 forms a hole 88 in the second object 82, as shown in FIG. 10. As the hole 88 is drilled by the self-drilling anchor screw 52, the self-drilling anchor screw 52 enters the hole 88 and enters into the second object 82.

Figure 11:
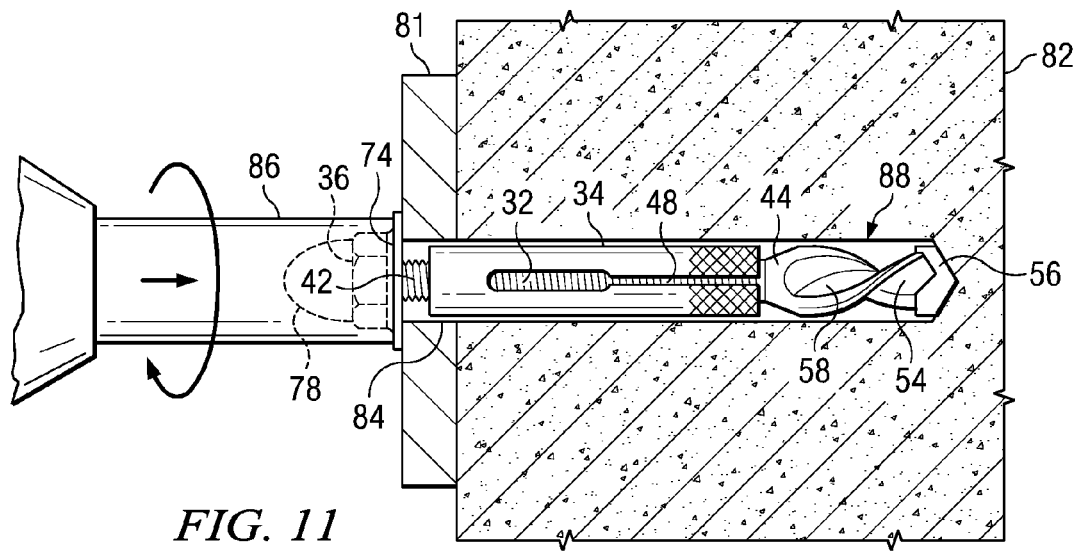

After the self-drilling anchor screw 52 is drilled into the second object 82 to a desired depth, as shown in FIG. 10 for example, the reverse rotation of the socket wrench 86 is halted. Then, as illustrated in FIG. 11, the socket wrench 86 is driven in the forward or clockwise direction as the socket wrench 86 re-engages or continues to engage the nut 36. The forward rotation of the nut 36 causes it to move toward the sleeve 34 along the threads of the threaded shaft portion 42. It also causes the shaft member 32 to move relative to the sleeve 34, as the shaft member 32 is in an outward direction relative to the surface of the second object 82.

Figure 12:
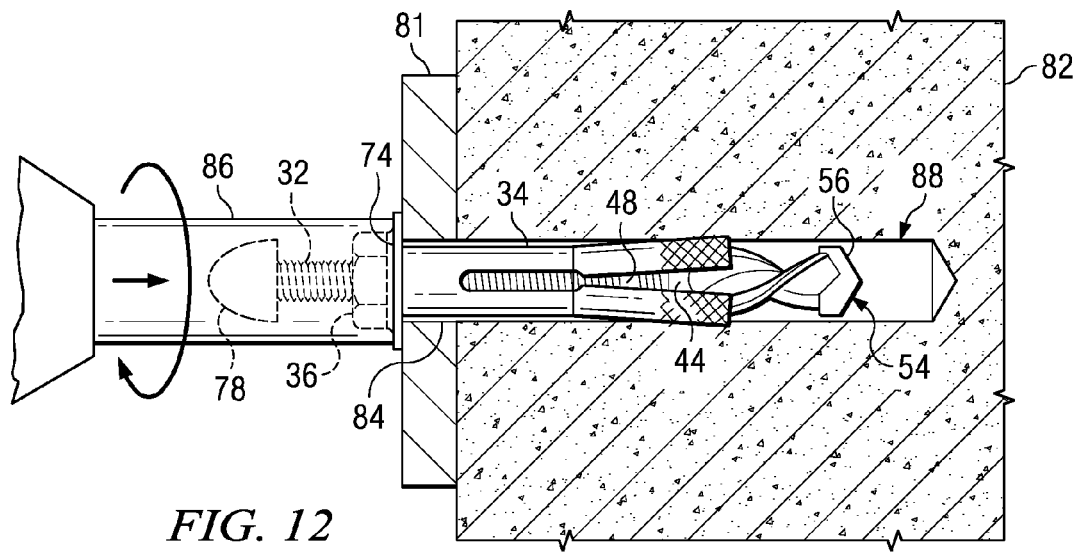

As illustrated in FIG. 12, continued forward rotation of the nut 36 causes the nut 36 to engage the sleeve 34 and press the sleeve 34 into the transition portion 44 of the shaft member 32. As the sleeve 34 engages the transition portion 44 of the shaft member 32 and moves closer to the drill bit portion 54, the transition portion 44 causes the sleeve 34 to expand. The longitudinal slots 48 in the sleeve 34 allow the sleeve 34 to expand as it is driven into the transition portion 44 of the shaft member 32. As the sleeve 34 continues to expand and part of the threaded shaft portion 42 of the shaft member 32 is drawn out of the hole 88 (see FIG. 12), the sleeve 34 is tightly wedged between the walls of the hole 88 and the shaft member 32. Eventually, by further tightening of the nut 36, this will cause the anchor screw 52 to be firmly anchored into the second object 82 and the nut 36 can be tightened to secure the first object 81 to the second object 82 using the anchor screw 52.

Figure 13:
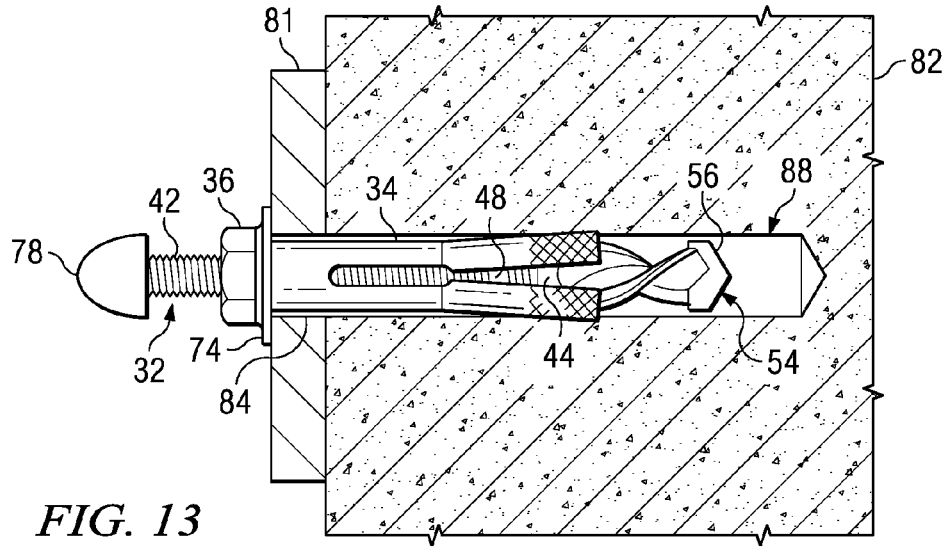

As shown in FIG. 13, after the nut 36 is tightened, the socket wrench 86 is removed and the anchor screw 52 is set. The second end 62 of the anchor screw 52 may be left intact, as shown in FIG. 13. However, if the second end 62 is protruding too far or is in the way, it may be removed. The second end 62 may be removed (not shown) in any suitable manner (e.g., sawing it off, breaking it off). Alternatively, the second end 62 may be left bent over (not shown).

As described above in the Background section, a typical method of using a conventional sleeve-type anchor screw 30 (see e.g., FIGS. 1-3) to attach a first object to a second object requires a predrilled hole, as well as the use of three tools and three steps: (i) drilling a hole with a separate drill bit and a drill tool; (ii) driving the conventional anchor screw 30 into the predrilled hole with a hammer; and (iii) tightening the nut with a socket wrench. Note that the method described above with respect to FIGS. 9-13 requires only one tool and two steps: (i) drive nut 36 of self-drilling anchor screw 52 in a reverse direction with a socket wrench 86 and (ii) drive the same nut 36 of the self-drilling anchor screw 52 in a forward direction with the same socket wrench 86. And note, these two steps can be performed without removing the socket wrench 86 from the nut 36. If a reversible drill or a reversible hammer drill is used to drive the socket wrench 86, the user simply needs to drive the nut 36 in a first direction (e.g., reverse) to drill the hole 88 with the self-drilling anchor screw 52, and then, flip the direction switch on the drill to drive the nut 36 in a second opposite direction (e.g., forward) to set the self-drilling anchor screw 52 and tighten the nut 36.

As will be apparent to a tradesman or craftsman from reading this description, a method of using a self-drilling anchor screw 52 of an embodiment of the present invention may provide numerous advantages, including (but not necessarily limited to):

Allowing one person to perform a task that would normally require two persons using a conventional anchor screw (e.g., one person to hold the object in place while the second person changes tools several times).

Reducing the amount of time required to drill and set each anchor screw. This can create huge cost savings in man-hours, and allow more jobs to be done per week.

Figure 14:
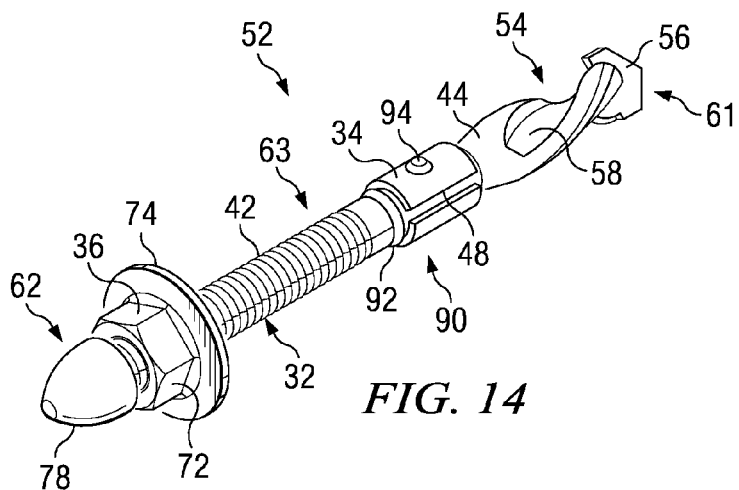
FIG. 14 shows a self-drilling anchor screw in accordance with a second illustrative embodiment of the present invention.
Figure 15:
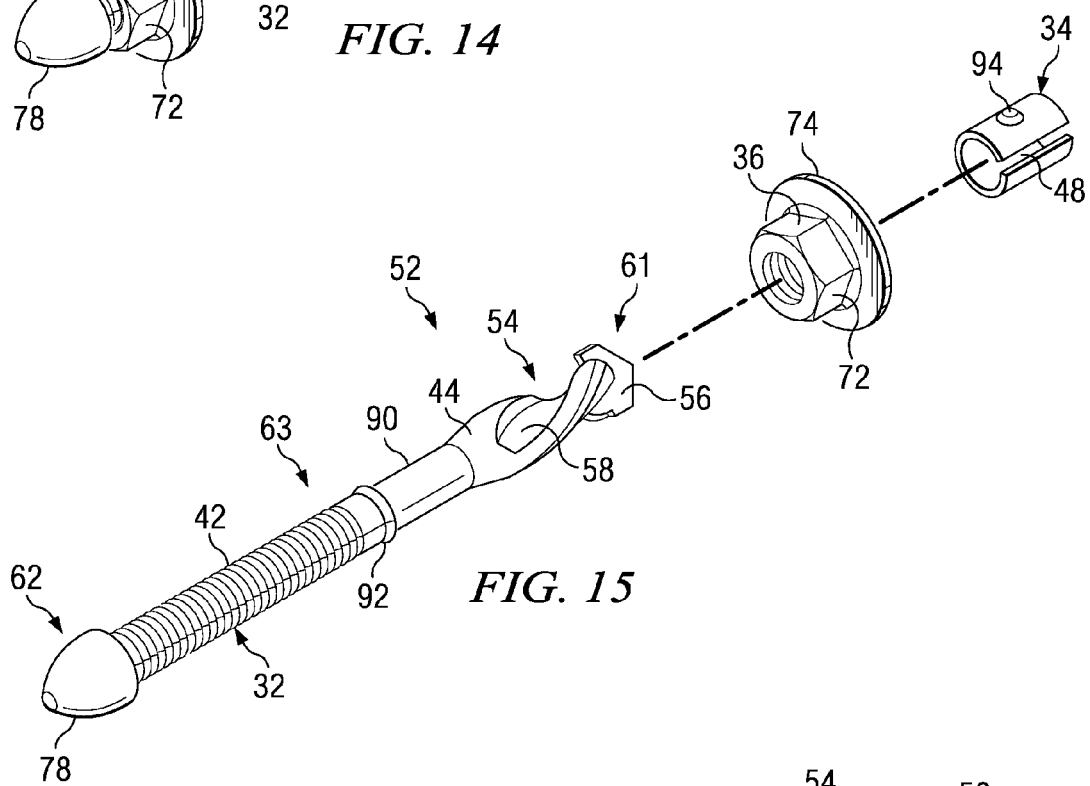
FIG. 15 is an exploded view of the self-drilling anchor screw shown in FIG. 14.

FIGS. 14 and 15 show a self-drilling anchor screw 52 in accordance with a second illustrative embodiment of the present invention. FIG. 14 shows the operably assembled self-drilling anchor screw 52 of the second embodiment in the way it would normally be sold and ready for usage. FIG. 15 is an exploded view of the self-drilling anchor screw 52 shown in FIG. 14 to better illustrate some of its components. The anchor screw 52 of the second embodiment has a sleeve arrangement to provide a wedge-type anchor screw configuration (compare to FIG. 4). In the second embodiment, the shaft member 32 has a sleeve-retention portion 90 located adjacent to the transition portion 44 and located between the transition portion 44 and the threaded shaft portion 42. The sleeve 34 of the second embodiment is located about the shaft member 32 at the sleeve-retention portion 90. The sleeve-retention portion 90 preferably includes a sleeve-stop portion 92 adapted to hinder the sleeve 34 from moving past the sleeve-stop portion 92 toward the threaded shaft portion 42. As the anchor screw 52 enters the hole it forms, the sleeve-stop portion 92 preferably prevents the sleeve 34 from moving out of the sleeve-retention portion 90 so that the sleeve 34 remains close to the transition portion 44 of the shaft member 32. The sleeve 34 of the second embodiment functions much like the sleeve 34 shown in the conventional wedge-type anchor screw 50 shown in FIG. 4. The sleeve 34 of the second embodiment has two bump portions 94 (one on top and one on bottom) that extend from an outside surface of the sleeve 34. In other embodiments or variations of the second embodiment, there may be no bump portions or any number of bump portions or protrusions extending from the sleeve 34. Also, in other embodiments or variations of the second embodiment, such bump portions 94 may have any suitable shape and size.

Like the first embodiment, the second embodiment shown in FIGS. 14 and 15 includes a nut stop portion 78, forward-threaded shaft portion 42, a flared nut 36, and a drill bit portion 54 with reverse-threaded flutes 58 and a masonry tip 56. The method of using the first embodiment to attach a first object 81 to a second object 82 shown in FIGS. 9-13, may also be used for the second embodiment. That is, the self-drilling anchor screw 52 of the second embodiment may be used to attach a first object 81 to a second object 82 using the same tool and steps described with respect to FIGS. 9-13 above.

Figure 16:
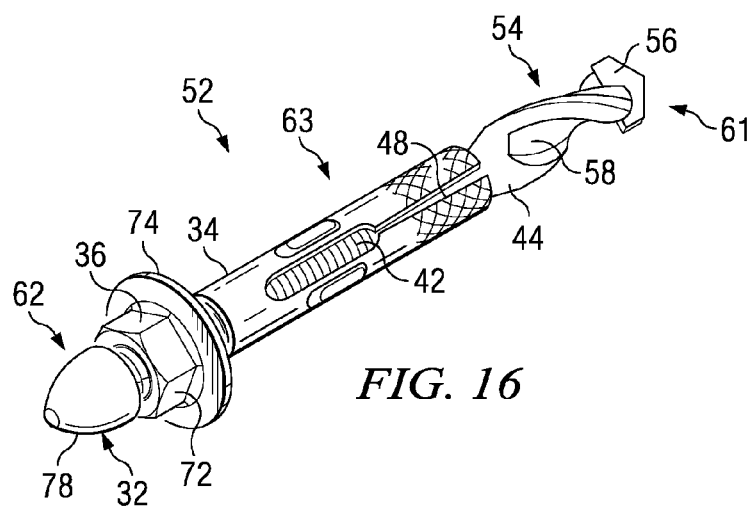
FIG. 16 shows a self-drilling anchor screw in accordance with a third illustrative embodiment of the present invention.

FIG. 16 shows a self-drilling anchor screw 52 in accordance with a third illustrative embodiment of the present invention. The third embodiment is the same as the first embodiment, except that the threaded flutes 58 of the drill bit portion 54 spiral in a same direction as the threads of the threaded shaft portion 42. Although this is less preferred than the first embodiment, it will work and can be used in accordance with the method described with respect to FIGS. 9-13. The flutes 58 of the drill bit portion 54 simply may not work as well at removing debris from the hole during drilling. This embodiment illustrates that the threads on the threaded shaft portion 42 may spiral in the same direction as the threaded flutes 58 on the drill bit portion 54.

FIG. 17 shows a self-drilling anchor screw 52 in accordance with a fourth illustrative embodiment of the present invention. The fourth embodiment is the same as the first embodiment, except that nut 36 differs. In the fourth embodiment, the nut 36 lacks the flared portion 74 (compare to FIG. 5) and a separate washer 38 is included. During use of this embodiment, the socket wrench may push against the washer 38 and the washer 38 in turn would push against the sleeve 34 while drilling the hole. Alternatively, the socket wrench may be adapted to push against the nut stop portion 78 during the drilling while driving the rotation of the anchor screw 52 via the nut 36.

FIG. 18 shows a self-drilling anchor screw 52 in accordance with a fifth illustrative embodiment of the present invention. The fifth embodiment is the same as the second embodiment, except that nut 36 differs. In the fifth embodiment, the nut 36 lacks the flared portion 74 (compare to FIG. 14) and a separate washer 38 is included. The fourth and fifth embodiments illustrate that the nut 36 may vary in an embodiment of the present invention and that a separate washer 38 may be included (even when a flared nut is used).

FIG. 19 shows a self-drilling anchor screw 52 in accordance with a sixth illustrative embodiment of the present invention. The sixth embodiment is the same as the first embodiment, except that the nut 36 differs and the sleeve 34 includes a washer portion 96. This washer portion 96 may be an integral part of the sleeve 34 (e.g., sleeve 34 with washer portion 96 formed from one piece of material), or this washer portion 96 may be attached (permanently or removably) to the sleeve 34 (e.g., by a spot weld, by adhesive). In this embodiment, the socket wrench may push against the washer portion 96 during the drilling to provide lateral pressure on the anchor screw 52 during the drilling.

The nut stop portion 78 of an embodiment of the present invention may be formed in numerous ways and may have any suitable shape or form. During manufacturing of a self-drilling anchor screw 52 of an embodiment, the nut stop portion 78 will typically be formed after placing the nut 36 on the threaded shaft portion 42. The nut stop portion 78 may be formed by adding more material to the second end 62 of the shaft member 32 by any suitable manufacturing method, including (but not limited to): welding, pressing, crimping, adhesive, mechanical attachment, press fitting, or combinations thereof, for example. Alternatively, the nut stop portion 78 may be formed from shaft member material after placing the nut 36 on the threaded shaft portion 42 by any suitable manufacturing method, include (but not limited to): forging, crimping, melting and reforming, pressing, molding, or combinations thereof, for example. The slightly elongated shaped of the nut stop portion 78 of the first embodiment (see e.g., FIG. 5) may add stability when trying to keep the anchor screw 52 straight during the drilling, as the nut stop portion 78 may engage the interior sidewalls of the socket wrench when the socket wrench is tilted relative to the nut 36, for example. FIGS. 20A-20F show some illustrative variations of nut stop portions 78 that may be incorporated into an embodiment of the present invention.

Figure 20D:
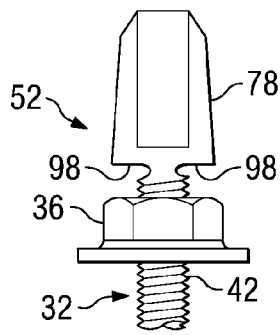

In FIG. 20A, the nut stop portion 78 has a flat top shape. In FIG. 20B, the nut stop portion 78 has an arbitrary shape formed by a welded blob of material or formed by melting and reforming the second end 62 of the shaft member 32, for example. In FIG. 20C, the nut stop portion 78 has an elongated shape. This form may be useful in an embodiment where the socket wrench will press on the shaft member via the nut stop portion 78, for example. In FIG. 20D, the nut stop portion 78 has an elongated tab shape and an filet 98 formed between the threaded shaft portion 42 and the nut stop portion

Figure 20E:
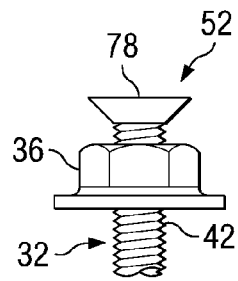
Figure 20F:
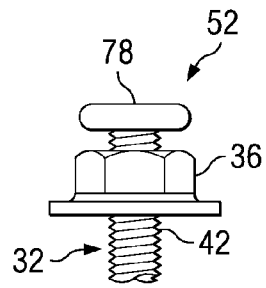
Figure 21A:
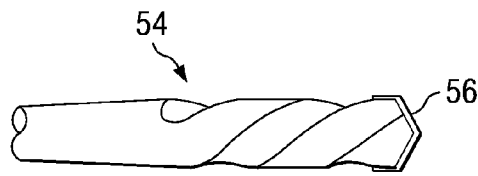
FIGS. 21A-21J show variations of drill bit portions that may be incorporated into an embodiment of the present invention.
Figure 21B:
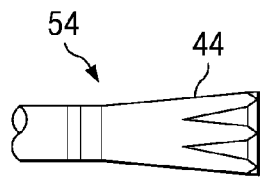
Figure 21C:
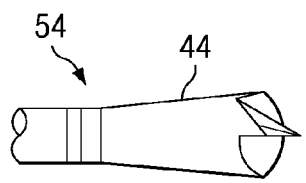
Figure 21D:
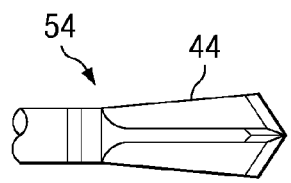
Figure 21E:
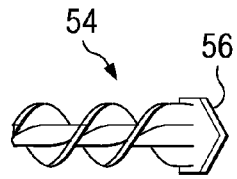
Figure 21F:
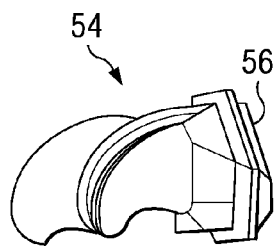
Figure 21G:
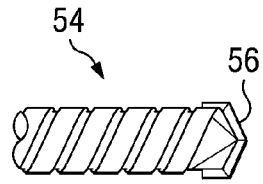
Figure 21H:
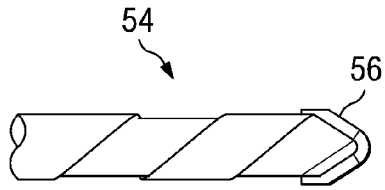
Figure 21I:
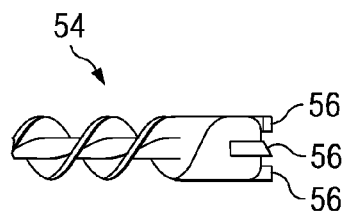
Figure 21J:
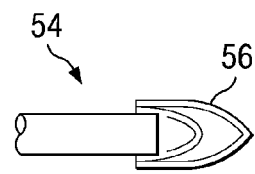

78. This variation may be useful for enabling the nut stop portion 78 to be broken off (e.g., using pliers) after the anchor screw 52 is set, which would enable the nut 36 to be removed after the anchor screw 52 is set, if desired. Alternatively, the flat sides of the nut stop portion 78 may be used to drive the rotation of the shaft member 32 (rather than driving the rotation of the shaft member 32 using the nut 36). In FIG. 20E, the nut stop portion 78 has a flat head shape with beveled sides. In FIG. 20F, the nut stop portion 78 has a flat top shape with rounded sides. Thus, the illustrative variations of the nut stop portion 78 shown in FIGS. 20A-20F show that there may be any suitable shape for the nut stop portion 78. In one embodiment (not shown), a small tack weld is placed at one or more thread openings to act as a nut stop portion 78 to prevent the nut 36 from being unscrewed from the threaded shaft portion 42. Preferable, a nut stop portion 78 has some portion (even if only on one side or in only one quadrant of the second end 2, for example) that prevents the nut 36 from being unscrewed from the threaded shaft portion 42 with sufficient strength to allow the nut 36 to drive the drilling of the anchor screw 52.

In an embodiment of the present invention, the sleeve 34 may be made from any suitable material, including (but not limited to): metal, steel, stainless steel, galvanized steel, zinc, aluminum, titanium, silica, magnesium, manganese, brass, nickel, bronze, cobalt, tungsten, iron, carbon, molybdenum, chromium, alloys thereof, compounds thereof, composites thereof, and combinations thereof, for example. The sleeve 34 may have any number of longitudinal slots 48 (1, 2, 3, 4, 5, 6, 10, etc.) formed therein, or none. There may be any suitable shape, pattern, and placement of the longitudinal slots 48. Preferably, the slot(s) open to the end of the sleeve 34 closest to the transition portion 44 of the shaft member 32. The sleeve 34 may have cross-hatch patterns or any other suitable pattern or ridges formed in its surface(s) (especially at the end closest to the transition portion 44 of the shaft member 32) to provide greater grip for the sleeve 34. The sleeve 34 may have a roughened or rough surface along part or all of it to increase the friction between the sleeve 34 and the second object 82 and/or between the sleeve 34 and the shaft member 32. In another embodiment (not shown), the sleeve 34 may have spiral flutes or longitudinal extending grooves formed therein to assist in the removal of debris and dust during drilling. The sleeve 34 may have holes formed therein to control expansion of the sleeve 34. Also, the sleeve 34 may have embossed portions (see e.g., FIG. 5), bumps 94 (see e.g., FIG. 14), or other suitable features to prevent buckling of the sleeve 34 when driving it into the hole and/or to provide additional grip for the sleeve 34.

The threads on the threaded shaft portion 42 may be in either direction (forward or reverse). It is simply preferred that the nut 36 corresponds with the threaded shaft portion 42 so that they can threadedly mated together. The threads for the threaded shaft portion 42 and the nut 36 may be any suitable type, pattern, and size (e.g., course, fine, metric, English, etc.).

In an embodiment of the present invention, the shaft member 32 may be made of any suitable material or combination of materials, including (but not limited to): metal, steel, stainless steel, galvanized steel, zinc, aluminum, titanium, silica, magnesium, manganese, brass, nickel, bronze, cobalt, tungsten, iron, carbon, molybdenum, chromium, alloys thereof, compounds thereof, composites thereof, and combinations thereof, for example. In a preferred embodiment, the nut stop portion 78, threaded shaft portion 42, transition portion 44, and drill bit portion 54 (except for the tip 56) are formed from a single piece of same material, with the drill bit tip 56 being made from a different material and inserted into the structure at some point during the manufacturing. The drill bit tip 56 is typically made from a very hard material, especially for masonry bits, such as (but not limited to): tungsten carbide, carbide steel, carbon, or diamond, for example.

The drill bit portion 54 may have any suitable shape and may be adapted for drilling into any type of building material or structural material, for example. The drill bit portion 54 preferably has spiral flutes 58, but it is not a necessary feature for an embodiment. FIGS. 21A-21J show some illustrative variations for drill bit portions 54 that may be incorporated into an embodiment of the present invention. Thus, FIGS. 21A-21J illustrate that there are many possible drill bit portion shapes, styles, and designs that may be incorporated into an embodiment of the present invention.

Because typical use of the drill bit portion 54 for a self-drilling anchor screw 52 of an embodiment will only drill one hole (for that anchor screw), the quality of the drill bit need not be great compared to drill bits designed for repeated usage (for drilling many holes). Thus, the drill bit tip 56 may be formed from the same material as other portions of the shaft member 32, or the drill bit tip 56 may be made from relatively inexpensive materials and/or using a relatively inexpensive manufacturing process; to keep costs low. In another embodiment, the drill bit portion 54 may be formed separately and from a different material than the remainder of the shaft member 32 and joined to the shaft member 32 (e.g., by welding or any other suitable means of attachment). Because the drill bit portion 54 typically will not be subjected to pulling forces during its use, the drill bit portion 54 may be removable attached or merely mated with the first end 61 of the shaft member 42 to provide a connection between the shaft member 32 and the drill bit portion 54 sufficient to provide the drilling action needed to form a hole while inserting the self-drilling anchor screw 52. Also, for an embodiment of the present invention, any form of cutting edge at the first end 61 of the shaft member 32 will suffice for the "drill bit portion 44." Furthermore, the drill bit portion 54 need not have a symmetrical form or specific shape.

Some of the advantages and benefits that an embodiment of the present invention may provide have been discussed already above. Other advantages that an embodiment of the present invention may provide include (but are not necessarily limited to):

Providing an equivalent strength and holding ability as a conventional anchor screw;

Ease of operation for installing and using anchor screws;

Less tools needed for the same job;

Increased speed in assembling structures and projects using anchor screws, which provides greater efficiency and less man hours per job (it is estimated that a self-drilling anchor screw of an embodiment can be installed about three times faster than a conventional anchor screw);

Increased safety in installing and using anchor screws (e.g., while standing on a ladder because no need to change tools);

Less stress and energy exerted by workman using installing the anchor screws (less steps in process of installing and using an anchor screw); and No need to purchase sets of drill bits and maintaining sharp bits (as bits where out regularly) (e.g., one less thing for workman to have to remember to take to the job site).

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of attaching a first object to a second object using a self-drilling anchor screw, wherein the self-drilling anchor screw comprises (a) a shaft member comprising a first end, second end, and a central portion extending between the first and second ends, (b) a masonry drill bit at the first end of the shaft member, (c) a threaded shaft portion located along at least part of the central portion of the shaft member, (d) a transition portion of the shaft member located between the threaded shaft portion and the masonry drill bit, and at least part of the transition portion having a larger cross-section area than that of the threaded shaft portion, (e) a nut having nut threads adapted to thread onto the threaded shaft portion of the shaft member, the nut being located on the threaded shaft portion, and the nut comprising a hexagonal portion and a flared portion, the flared portion having a larger diameter than the hexagonal portion, (f) a sleeve located about the shaft member and located along part of the central portion between the nut and the transition portion, the sleeve being capable of sliding along the shaft member for engaging the transition portion, and the sleeve comprises a longitudinal slit for allowing the sleeve to expand as it is pushed against the transition portion of the shaft member, and (g) a nut stop portion at the second end of the shaft member, the nut stop portion being adapted to prevent the nut from being unscrewed from the threaded shaft portion at the second end of the shaft member, the method comprising:

engaging the nut with a socket wrench;

turning the socket wrench in a reverse or counter-clockwise direction while pressing the socket wrench against the nut toward a surface of a second object into which the self-drilling anchor screw will be installed so that the masonry bit is engaging the surface, wherein the nut engages the nut stop portion so that the nut drives the rotation of the shaft member;

drilling a hole into the second object using the masonry bit during the turning in the counter-clockwise direction, wherein part of the self-drilling anchor screw enters into the hole and into the second object during the drilling;

after the self-drilling anchor screw is drilled into the second object to a desired depth, turning the nut with the socket wrench in a forward or clockwise direction so that the nut presses the sleeve toward the transition portion of the shaft member, thereby expanding the sleeve at the transition portion of the shaft member as the longitudinal slit engages the transition portion and thereby anchoring the self-drilling anchor screw in the second object; and tightening the nut further to attach the first object to the second object using the anchored self-drilling anchor screw.

2. A method of attaching a first object to a second object with a self-drilling anchor screw using only one tool, comprising:

engaging a nut of the self-drilling anchor screw with a socket wrench of the one tool, wherein the self-drilling anchor screw comprises a shaft member comprising a first end, second end, and a central portion extending between the first and second ends, a drill bit portion at the first end of the shaft member, a threaded shaft portion located along at least part of the central portion of the shaft member, a transition portion of the shaft member located between the threaded shaft portion and the drill bit portion, wherein at least part of the transition portion has a larger cross-section area than that of the threaded shaft portion, the nut having nut threads adapted to thread onto the threaded shaft portion of the shaft member, and the nut being located on the threaded shaft portion, a sleeve located about the shaft member and at least part of the sleeve being located adjacent to the transition portion, the sleeve being capable of sliding along the shaft member for engaging the transition portion, and a nut stop portion at the second end of the shaft member, the nut stop portion being adapted to prevent the nut from being unscrewed from the threaded shaft portion at the second end of the shaft member;

turning the socket wrench of the one tool in a first direction while engaging the nut and while pressing the socket wrench against the self-drilling anchor screw toward a surface of a second object into which the self-drilling anchor screw will be installed so that the drill bit portion is engaging the surface, wherein the nut engages the nut stop portion so that the nut drives the rotation of the shaft member;

drilling a hole into the second object using the drill bit portion during the turning in the first direction, wherein part of the self-drilling anchor screw enters into the hole and into the second object during the drilling;

after the self-drilling anchor screw is drilled into the second object to a desired depth, turning the nut with the socket wrench of the one tool in a second direction so that the nut presses the sleeve toward the transition portion of the shaft member, thereby expanding the sleeve at the transition portion of the shaft member as the sleeve engages the transition portion and thereby anchoring the self-drilling anchor screw in the second object, wherein the second direction is opposite the first direction; and tightening the nut further using the socket wrench of the one tool to attach the first object to the second object using the anchored self-drilling anchor screw.

3. The method of claim 2, wherein the first direction is a counter-clockwise direction and the second direction is a clockwise direction.

4. The method of claim 2, wherein the first direction is a clockwise direction and the second direction is a counter-clockwise direction.

5. The method of claim 2, wherein the drill bit portion comprises a masonry bit.

6. The method of claim 2, wherein the sleeve extends over and is adapted to slide over at least part of the threaded shaft portion.

7. The method of claim 2, wherein the shaft member comprises a sleeve-retention portion located adjacent to the transition portion and located between the transition portion and the threaded portion, wherein the sleeve is located about the shaft member at the sleeve-retention portion, and wherein the sleeve-retention portion comprises a sleeve-stop portion adapted to hinder the sleeve from moving past the sleeve-stop portion toward the threaded portion.

8. The method of claim 7, wherein the sleeve comprises a bump portion extending from an outside surface of the sleeve.

9. The method of claim 2, wherein the nut comprises a hexagonal portion and a flared portion, the flared portion having a larger diameter than a hexagonal portion.

10. The method of claim 2, wherein the drill bit portion comprises threaded flutes.

11. The method of claim 10, wherein the threaded flutes spiral in a first spiral direction, wherein the threaded portion of the shaft member spiral in a second spiral direction, and wherein the first spiral direction is opposite the second spiral direction.

12. The method of claim 11, wherein the drill bit portion is adapted to cut when rotating in a counter-clockwise direction, and wherein the first spiral direction is a reverse thread direction.

13. The method of claim 10, wherein the threaded flutes spiral in a first spiral direction, and wherein the threaded portion of the shaft member spiral in the first spiral direction.

14. The method of claim 2, further comprising a washer located about the central portion of the shaft member, wherein the washer is located between the nut and the sleeve.

15. The method of claim 2, wherein the nut stop portion has an elongated shape extending from the second end of the shaft member.

16. The method of claim 2, wherein the nut stop portion has a generally flattened shape.

17. The method of claim 2, wherein the sleeve comprises a longitudinal slit for allowing the sleeve to expand as it is pushed against the transition portion of the shaft member.

18. The method of claim 2, wherein a largest cross-section dimension of the nut stop portion, as taken perpendicular to a longitudinal axis of the shaft member, is equal to or less than an outside cross-section dimension of the nut, as taken perpendicular to the longitudinal axis of the shaft member, such that the socket wrench of the one tool can initially engage the nut while moving along the longitudinal axis of the shaft member and while going over the nut stop portion.

19. A method of attaching a first object to a second object with a self-drilling anchor screw, comprising:
    moving a socket wrench of one tool generally along a longitudinal axis of a shaft member of the self-drilling anchor screw, toward a nut of the self-drilling anchor screw, wherein the shaft member has a first end, a second end, and a central portion;
    while moving the socket wrench along the longitudinal axis toward the nut and while engaging the nut with the socket wrench, the socket wrench goes over a nut stop portion of the self-drilling anchor screw, wherein the nut stop portion is at the second end of the shaft member for preventing the nut from being unscrewed from a threaded shaft portion at the second end of the shaft member;
    while engaging the nut with the socket wrench, turning the socket wrench in a first rotational direction, such that the nut engages the nut stop portion thereby causing the nut to drive rotation of the shaft member in the first rotational direction;
    while turning the nut, and thereby the shaft member, in the first rotational direction using the socket wrench, pressing the socket wrench against the self-drilling anchor screw in a first vector generally along the longitudinal axis toward a surface of the second object while a drill bit portion at the first end of the self-drilling anchor screw passes through an opening in the first object to engage the surface of the second object;
    drilling a hole into the second object using the drill bit portion during the turning in the first rotational direction, such that at least part of the self-drilling anchor screw enters into the hole formed in the second object during the drilling;
    after the hole is drilled into the second object using the drill bit portion to a desired depth, turning the nut with the socket wrench in a second rotational direction, opposite the first rotational direction, so that the nut moves away from the nut stop portion along the longitudinal axis and so that the nut presses a sleeve member of the self-drilling anchor screw toward the first end of the self-drilling anchor screw, wherein the sleeve member is located at least partially about the shaft member at the central portion of the self-drilling anchor screw; and
    compressing the sleeve member of the self-drilling anchor screw against internal surfaces of the hole in the second object using the nut driven against the sleeve member by the rotation of the socket wrench in the second rotational direction, while a portion of the first object adjacent the opening in first object is located between the nut and the second object, such that as the nut is tightened, the self-drilling anchor screw is held in the second object by the compressing of the sleeve member against internal surfaces of the hole in the second object and the first object is attached to the second object by the nut pressing against the portion of the first object located between the nut and the second object.

20. The method of claim 19, wherein
the second object is a masonry object;
the drill bit portion is a masonry bit;
the first rotational direction is counter clockwise; and
the nut comprises a hexagonal portion and a flared portion, the flared portion having a larger diameter than a hexagonal portion.

* * * * *